(12) United States Patent
Higashihama et al.

(10) Patent No.: US 9,166,496 B2
(45) Date of Patent: Oct. 20, 2015

(54) LOAD CONTROL DEVICE

(75) Inventors: Hirotada Higashihama, Mie (JP); Yu Saitou, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 441 days.

(21) Appl. No.: 13/812,161

(22) PCT Filed: Feb. 24, 2011

(86) PCT No.: PCT/IB2011/000373
§ 371 (c)(1),
(2), (4) Date: Jan. 25, 2013

(87) PCT Pub. No.: WO2012/014020
PCT Pub. Date: Feb. 2, 2012

(65) Prior Publication Data
US 2013/0128641 A1   May 23, 2013

(30) Foreign Application Priority Data

Jul. 27, 2010   (JP) ................................. 2010-168349

(51) Int. Cl.
*H02M 7/06*   (2006.01)
*H05B 33/08*  (2006.01)

(52) U.S. Cl.
CPC ........... *H02M 7/066* (2013.01); *H05B 33/0815* (2013.01); *H05B 33/0845* (2013.01); *Y02B 20/346* (2013.01)

(58) Field of Classification Search
CPC ......... H02M 7/066; H02M 7/02; H02M 3/07; H02M 3/073; H02M 2003/077; H02M 7/155; H02M 7/1557
USPC ............... 363/34, 44, 45, 65, 74, 75, 80, 123, 363/125, 126, 127, 128; 315/291, 307, 311; 307/86, 82; 323/311, 282–285, 265, 323/266, 272

See application file for complete search history.

(56) References Cited

U.S. PATENT DOCUMENTS 4,167,777 A  *  9/1979  Allington ........................ 363/61
5,331,234 A      7/1994  Merritt et al.
(Continued)

FOREIGN PATENT DOCUMENTS

CN       1722330 A    1/2006
JP       H10-23672    1/1998
(Continued)

OTHER PUBLICATIONS

Japanese Office Action dated Jul. 1, 2014 for corresponding Japanese Application No. 2010-168349 and English summary thereof.
(Continued)

*Primary Examiner* — Timothy J Dole
*Assistant Examiner* — Shahzeb K Ahmad
(74) *Attorney, Agent, or Firm* — Renner, Otto, Boisselle & Sklar, LLP

(57) ABSTRACT

A two-wire load control device prevents load malfunctioning, such as erroneous emission of an LED, due to a leak current, even when loads not taking countermeasures against noise are connected. The load control device is connected in series between a commercial power source and a load and an off power supply for ensuring an inner power supply at the time of turning off the load is provided with capacitors, which are switched to be connected in series or parallel, based on an input voltage. The control device makes the capacitors repeat charging and discharging, and a power discharged from the capacitors is used as the inner power supply, thereby reducing standby power requirement of the load control device at the time of turning off the load.

17 Claims, 10 Drawing Sheets

(56) References Cited

U.S. PATENT DOCUMENTS

| | | | |
|---|---|---|---|
| 5,587,894 A * | 12/1996 | Naruo | 363/84 |
| 5,838,555 A * | 11/1998 | Lejeune et al. | 363/49 |
| 6,262,565 B1 * | 7/2001 | Williams et al. | 323/237 |
| 7,009,858 B2 * | 3/2006 | Umeda et al. | 363/65 |
| 7,872,886 B2 * | 1/2011 | Xu et al. | 363/65 |
| 7,907,429 B2 * | 3/2011 | Ramadass et al. | 363/59 |
| 8,975,785 B2 * | 3/2015 | Goto | 307/86 |
| 2004/0251884 A1 * | 12/2004 | Steffie et al. | 323/282 |

FOREIGN PATENT DOCUMENTS

| | | |
|---|---|---|
| JP | H10-23762 | 1/1998 |
| JP | H1169837 A * | 3/1999 |
| JP | 2000-133473 | 5/2000 |
| JP | 2002-334799 | 11/2002 |
| JP | 2006-33497 | 2/2006 |
| JP | 2008-97535 | 4/2008 |
| WO | 2010/020855 | 2/2010 |

OTHER PUBLICATIONS

International Search Report for corresponding International Application No. PCT/IB2011/000373 mailed Jun. 21, 2011.
Form PCT/ISA/237 for corresponding International Application No. PCT/IB2011/000373 dated Jun. 21, 2011.
Search Report of Chinese Office Action for corresponding Chinese Application No. 201180036705.3 dated Feb. 21, 2014 and English translation.

* cited by examiner

LOAD CONTROL DEVICE

FIELD OF THE INVENTION

The present invention relates to a two-wire load control device.

BACKGROUND OF THE INVENTION

Conventionally, in order to control the ON/OFF of a load such as a lighting apparatus, a ventilation fan or the like, a load control device (an electronic switch) using a non-contact switch device such as a triac has been put to practical use instead of a two-wire switch in which contacts are mechanically closed or opened (see, e.g., Japanese Patent Application Publication No. 2008-97535). Such a load control device generally employs a two-wire connection to reduce a wire and is connected in series between a commercial power source (an AC power source) and a load. In the case of the load control device connected between the commercial power source and the load, how to acquire its own circuit power is an issue.

FIG. 10 shows the circuit configuration of a conventional two-wire load control device 50 that is connected in series between a commercial power source 2 and a load 3. This load control device 50 includes primary and auxiliary switching units 51 and 57 configured to control the ON and OFF of the load 3, a control unit 53 configured to control the conduction of the primary and auxiliary switching units 51 and 57, and a power supply circuit configured to supply a driving power to the control unit 53. The power supply circuit includes a rectifying unit 52, a first power supply unit 54 configured to stabilize supply of a power to the control unit 53, a second power supply unit 55 configured to supply a power to the first power supply unit 54 when the power supply to the load 3 is stopped, and a third power supply unit 56 configured to supply a power to the first power supply unit 54 when the power supply to the load 3 is performed. The auxiliary switching unit 57 includes, e.g., a thyristor 57a, which functions to allow a main circuit current to flow into the load 3 when the capacity of the load 3 is small and also only a current that is lower than the holding current required to maintain the conduction of the triac (main switch device) 51a of the primary switching unit 51 flows.

The second power supply unit 55 is a constant voltage circuit that includes, e.g., a resistor configured to limit a current, a Zener diode (constant voltage diode) 55a configured to clip a voltage and the like. A ripple current which has been full-wave rectified by the rectifying unit 52 is inputted into the second power supply unit 55. Further, only when the voltage value of the inputted ripple current is higher than the Zener voltage of the Zener diode 55a, a current flows therethrough. A part of the current flows into the first power supply unit 54 to be supplied as a power of the control unit 53 and is charged in a buffer capacitor 54a connected to the input terminal of the first power supply unit 54. When the voltage of the ripple current full-wave rectified by the rectifying unit 52 is lower than the Zener voltage, the buffer capacitor 54a becomes a power source, and thus supplies a power to the first power supply unit 54. Accordingly, the buffer capacitor 54a repeats charging and discharging.

In other words, even when the load 3 is in an OFF state, a current flows into the load 3 via the Zener diode 55a and the rectifying unit 52. In this case, the current flowing into the load 3 needs to have a small magnitude that prevents an erroneous operation of the load 3. Further, the current consumption of the control unit 53 is set to be kept small and the impedance of the second power supply unit 55 is set to be kept high. Further, the first power supply unit 54 functions as a voltage stabilization unit.

Meanwhile, when an operating handle SW 4 that activates the load 3 is manipulated, the control unit 53 outputs a control signal to make the switch device 56c of the third power supply unit 56 to be conductive, whereby the buffer capacitor 54a is charged. When the buffer capacitor 54a is charged, the current passes through the Zener diode 56a, the thyristor 57a of the auxiliary switching unit 57, and the triac 51a of the primary switching unit 51 in sequence. When the triac 51a becomes ON, the rectification voltage of the rectifying unit 52 becomes almost zero, and thus, the second power supply unit 55 becomes non-conductive and no current flows. The same is true of the third power supply unit 56.

While the second power supply unit 55 and the third power supply unit 56 are non-conductive, the first power supply unit 54 is supplied with a power from the buffer capacitor 54a, and thus, the input voltage of the first power supply unit 54, i.e., the terminal voltage of the buffer capacitor 54a, is gradually decreased. Meanwhile, when the current flowing into the triac 51a becomes 0, the triac 51a is caused to enter an open state (a non-conductive state) by self arc-extinguishing and a voltage is generated in the rectifying unit 52. When the voltage increases above the terminal voltage of the buffer capacitor 54a, the buffer capacitor 54a starts to be charged. Since the impedance of the second power supply unit 55 is set to be a value sufficiently higher than that of the third power supply unit 56, the second power supply unit 55 does not contribute to the operation of the load control device 50 while the load 3 is ON.

Once the primary switching unit 51 has become conductive (a closed state), it continuously flows the current. However, when the commercial current reaches a zero-cross point, the triac 51a is self arc-extinguished, and the primary switching unit 51 becomes non-conductive (an open state). When the primary switching unit 51 becomes non-conductive, an operation of acquiring the circuit power by the load control device 50, in which the current flows from the rectifying unit 52 through the third power supply unit 56 to the first power supply unit 54, is performed. That is, in every half period of AC, the operation of acquiring the circuit power by the load control device 50, and the conduction of the auxiliary switching unit 57 and the conduction of the primary switching unit 51 are repeated.

However, in order to reduce the power consumption, replacement to LED (Light-Emitting Diode) lamps has been conducted. Since an LED device emits a light by using DC, a power supply circuit configured to convert AC into DC is provided in the LED lamp. However, there are power supply circuits for some loads, such as inexpensive LED lamps, which have no countermeasures against noise (e.g., the parallel connection of a capacitor or the like between the terminals of a power supply circuit). When an LED lamp without noise countermeasures is connected as a load to the two-wire load control device 50, a current flows into the load because of the acquisition of the load control device 50's own circuit power even when the load needs to be in an OFF state. Therefore, there is a possibility of the erroneous operation of the load (e.g., flickering of the LED lamp). Further, in the conventional load control device 50, a voltage is stepped down by the Zener diode 55a, and thus, an energy corresponding to the voltage step-down is consumed by thermal conversion. Accordingly, the conventional load control device 50 does not contribute to the improvement of energy efficiency.

SUMMARY OF THE INVENTION

In view of the above, the present invention provides a two-wire load control device capable of reducing a standby power of a load control device (the power consumption of an internal power source) while a load is turned off, and preventing an erroneous operation of a load (the erroneous light emission of an LED lamp) attributable to a leakage current when the load, e.g., the LED lamp or the like, without countermeasures against noise, is connected.

In accordance with an aspect of the present invention, there is provided a two-wire load control device connected in series between a commercial power source and a load including: an off power supply unit configured to acquire an internal power when the load is turned off, wherein the off power supply unit includes a plurality of capacitors of which series and parallel connections are switched based on a level of input voltage. Charging and discharging of the plurality of the capacitors are repeated and a power obtained by discharging of the plurality of capacitors is used as the internal power.

In accordance with another aspect of the present invention, there is provided a two-wire load control device connected in series between a commercial power source and a load including: a primary switching unit configured such that main electrodes of a main switch device are connected in series to the commercial power source and the load, and configured to control power supply to load; a rectifying unit connected between the main electrodes of the main switch device; a control unit configured to control ON and OFF of the load in response to a signal from an outside; a first power supply unit configured to reliably supply a power to the control unit; a second power supply unit configured to supply a power to the first power supply unit when a power is supplied from both ends of the primary switching unit via the rectifying unit and the load is turned off; and a third power supply unit configured to supply power to the first power supply unit when a power is supplied from both ends of the primary switching unit via the rectifying unit and the load is turned on.

The first power supply unit is a DC/DC converter configured to step down an input DC current so that an output voltage decreases below an input voltage. The second power supply unit includes a plurality of capacitors, a series/parallel switching circuit configured to switch between series and parallel connections of the plurality of capacitors, a first switch connected to an output terminal for the first power supply unit and a first switch controller configured to control ON (a closed state) and OFF (an open state) of the first switch.

When a voltage inputted to the second power supply unit is higher than a predetermined voltage, the series/parallel switching circuit allows the plurality of capacitors to be connected in series and charge the plurality of capacitors, and the first switch controller turns the first switch off (an open state). When the voltage inputted to the second power supply unit is equal to or lower than the predetermined voltage, the series/parallel switching circuit allows the plurality of capacitors to be connected in parallel and discharge the plurality of capacitors, and the first switch controller turns the first switch on (a closed state), so that charging and discharging of the plurality of capacitors are repeated, thereby stepping down the voltage inputted from the rectifying unit to a predetermined level and then outputting resulting voltage.

In accordance with the above-described configuration, in the second power supply unit (an off power supply unit) that is the internal power source of the load control device when the load is turned off, the peak voltage of input voltage pulsating current is stepped down based on the number of capacitors that are connected in series. When voltage is stepped down by the second power supply unit (the off power supply unit), energy loss attributable to thermal conversion is considerably small compared to the case using a Zener diode, and thus the standby power of a load control device (the power consumption of an internal power source) can be reduced. Furthermore, since a current flowing into the load via the second power supply unit (off power supply unit) while the load is turned off is further reduced, the possibility of the load being erroneously operated is reduced even when a load, such as an LED lamp without countermeasures against noise, is connected.

The second power supply unit may further include a voltage clamp circuit configured to clamp the voltage inputted from the rectifying unit to a predetermined value, thereby preventing a voltage above the predetermined voltage from being applied to the plurality of capacitors that are connected in series.

The series/parallel switching circuit may include a second switch connected to terminals of the plurality of capacitors and configured to switch between series and parallel connections of the plurality of capacitors and a second switch controller configured to control a connection state of the second switch.

The plurality of capacitors may be three or more in number, and the second switch controller varies the number of the plurality of capacitors that are connected in series.

The second power supply unit may further include a peak voltage detection unit configured to detect a peak voltage of voltage from the commercial power source or the rectifying unit, and the second switch controller varies the number of the plurality of capacitors that are connected in series by the second switch based on a peak voltage of the commercial power source.

The series/parallel switching circuit preferably includes first diodes connected in series between the plurality of capacitors and second diodes connected such that a current flows in an opposite direction to a direction in which the current flows during the charging.

The plurality of capacitors may be three or more in number, the second power supply unit may further include a third switch connected in parallel to at least one of the plurality of capacitors and a third switch controller configured to control ON (a closed state) and OFF (an open state) of the third switch, and the number of the plurality of capacitors connected in series may be varied by controlling the ON (closed state) and OFF (open state) of the third switch.

The second power supply unit may further include a peak voltage detection unit configured to detect a peak voltage of voltage inputted from the commercial power source or the rectifying unit, and the third switch controller preferably varies the number of the plurality of capacitors connected in series by the third switch based on the peak voltage of the commercial power source.

The second power supply unit may further include a current limiting device configured to limit an amount of current with which the plurality of capacitors is charged when the plurality of capacitors are connected in series.

The current limiting device may vary the amount of current, the second power supply unit may further include an output voltage detection unit configured to detect a voltage outputted from the second power supply unit to the first power supply unit and a current limiting device controller configured to control the amount of current by the current limiting device; and the current limiting device controller preferably controls the amount of current by the current limiting device based on the voltage outputted from the second power supply unit which is detected by the output voltage detection unit.

The second power supply unit may further include a peak voltage detection unit configured to detect a peak voltage of voltage inputted from the commercial power source or the rectifying unit, and the first switch controller preferably controls a time for which the first switch is opened based on the peak voltage.

The first switch and the first switch controller may be formed of semiconductor devices configured to be conductive in response to an input of a predetermined control signal, and a voltage outputted from the rectifying unit may be inputted to the semiconductor devices as the control signal.

The first switch and the first switch controller may be formed of semiconductor devices configured to be conductive in response to input of a predetermined control signal, and a voltage outputted from the voltage clamp circuit may be inputted to the semiconductor devices as the control signal.

The first switch controller may control a time for which the first switch is opened based on the voltage outputted from the second power supply unit.

The voltage clamp circuit may include a plurality of constant voltage diodes that are connected in series, and an intermediate conjunction of the plurality of constant voltage diodes connected in series is connected to an input unit of the first power supply unit, so that a part of current to flow the plurality of constant voltage diodes connected in series is caused to flow into the first power supply unit.

The voltage clamp circuit may include a plurality of constant voltage diodes connected in series and a switch device connected in parallel to at least one of the constant voltage diodes. The load control device may further include a peak voltage detection unit configured to detect a peak voltage of voltage inputted from the commercial power source or the rectifying unit and a fourth switch controller configured to control ON (a closed state) and OFF (an open state) of the switch device, and the fourth switch controller may vary a voltage of the constant voltage diode based on the peak voltage.

BRIEF DESCRIPTION OF THE DRAWINGS

The objects and features of the present invention will be apparent from the following descriptions of preferred embodiments given in conjunction with the accompanying drawing, as follows.

DETAILED DESCRIPTION OF THE EMBODIMENTS

Hereinafter, embodiments of the present invention will be described in detail with reference to the accompanying drawings which form a part hereof. The same reference symbols are assigned to the same or like components throughout the drawings, and redundant descriptions thereof will be omitted.

(First Embodiment)

Figure 1:
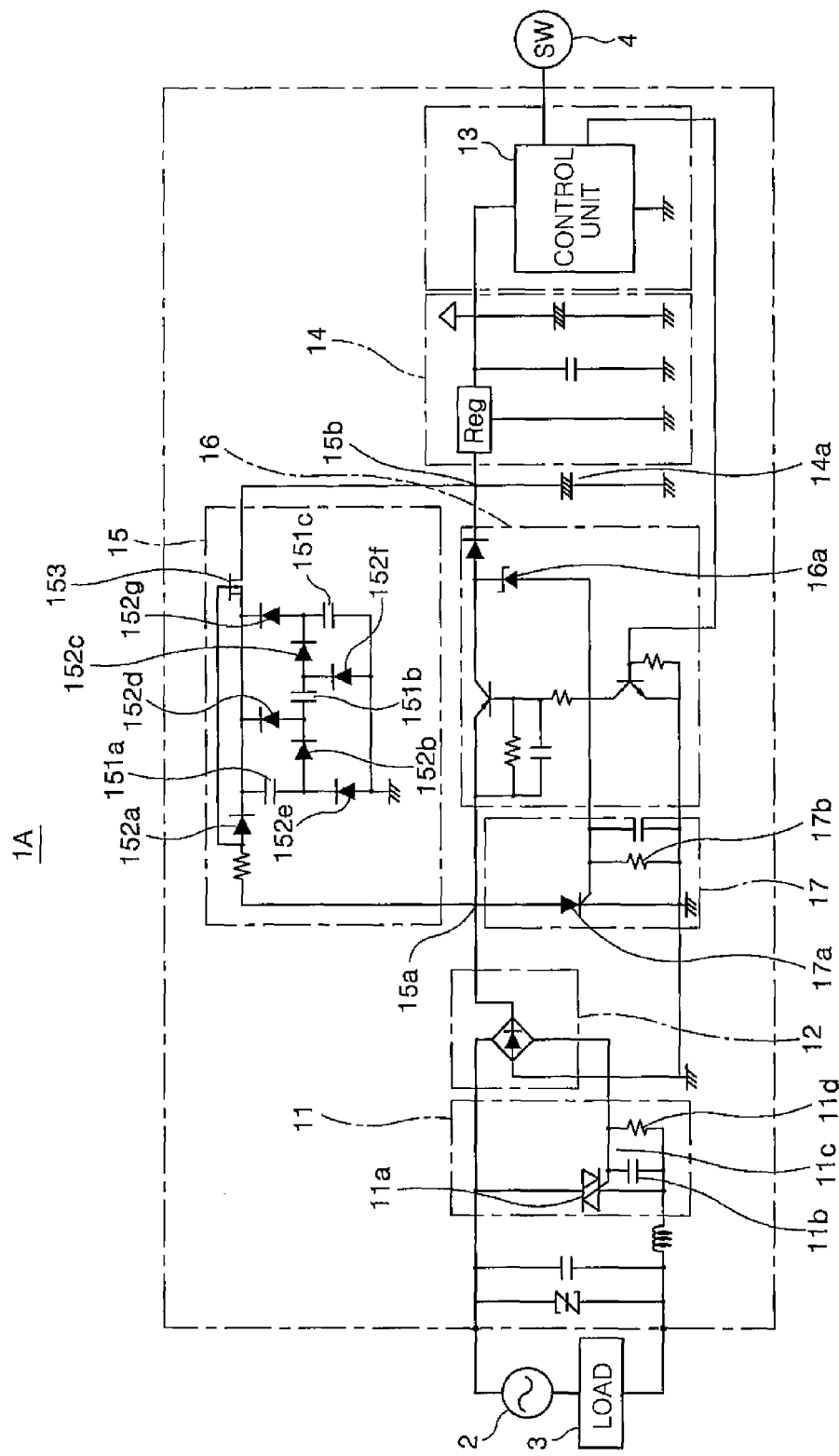
FIG. 1 is a circuit diagram showing a configuration of a two-wire load control device in accordance with a first embodiment of the present invention.
Figure 2:
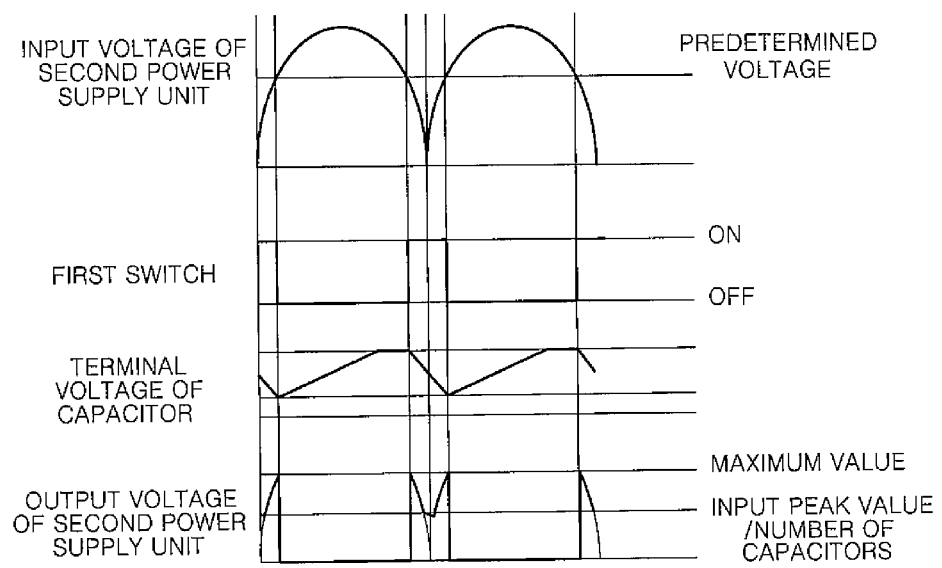
FIG. 2 is a timing chart illustrating the voltage and operation of each component of the two-wire load control device in accordance with the first embodiment of the present invention.

A two-wire load control device 1A in accordance with a first embodiment of the present invention will be described with reference to FIGS. 1 and 2. FIG. 1 is a circuit diagram showing the configuration of the two-wire load control device 1A, and FIG. 2 is a timing chart illustrating the voltage and operation of each component. The load control device 1A is connected in series to a commercial power source 2 and a load 3. Like the conventional example, the load control device 1A includes primary and auxiliary switching units 11 and 17 configured to control the ON and OFF of the load 3, a control unit 13 configured to control the conduction of the primary and auxiliary switching units 11 and 17, and a power supply circuit configured to supply a driving power to the control unit 13.

The power supply circuit includes a rectifying unit 12, a first power supply unit 14 configured to stabilize the supply of power to the control unit 13, a second power supply unit 15 configured to supply a power to the first power supply unit 14 when the power supply to the load 3 is stopped, and a third power supply unit 16 configured to supply a power to the first power supply unit 14 when the power supply to the load 3 is performed. Since the auxiliary switching unit 17 includes, e.g., a thyristor 17a, and thus supplies a current of desired magnitude to the gate of triac (the main switch device) 11a to make the main switch device 11a of the primary switching unit 11 conductive. The first power supply unit 14 is a DC/DC converter that steps down an input DC current so that an output voltage is lower than an input voltage. Since all components except for the second power supply unit 15 are the same as the corresponding components of the conventional example, descriptions thereof will be omitted.

The second power supply unit 15 includes a plurality of (e.g., three) capacitors 151a to 151c, and a plurality of diodes 152a to 152g connected between the terminals of the capacitors 151a to 151c. Further, a first switch (FET) 153 is connected to the output terminal 15b of the second power supply unit 15, and the input voltage of the second power supply unit 15 is applied to the control electrode of the first switch 153 (gate electrode of FET). Since a full-wave rectified ripple current (i.e., the input voltage of the second power supply unit 15) is outputted from the rectifying unit 12, as shown in FIG. 2, it is assumed that the first switch 153 becomes ON (closed state) and the input voltage of the second power supply unit 15 is 0V.

As the input voltage of the second power supply unit increases, a current flows into the first power supply unit 14 via the diode 152a and the first switch 153. When the input voltage of the second power supply unit 15 increases above a predetermined voltage, the first switch 153 becomes OFF (open state) and the supply of power to the first power supply unit 14 is stopped, and thus a power is supplied from the buffer capacitor 14a to the first power supply unit 14.

When the first switch 153 becomes OFF (open state), the diode 152a, the capacitor 151a, the diode 152b, the capacitor 151b, the diode 152c, and the capacitor 151c are connected in series to each other, and thus the current flows to the ground via the series circuit thereof. During the period, the capacitors 151a to 151c are respectively charged, and the terminal voltage of each of the capacitors 151a to 151c is a voltage that is obtained by dividing the peak voltage of input voltage by the number of capacitors under a condition that the capacitors (parts) of the same specifications are used. The diodes 152a, 152b and 152c function as first diodes that connect the capacitors 151a to 151c in series.

When the input voltage of the second power supply unit 15 becomes equal to or lower than the predetermined voltage, the first switch 153 becomes ON (closed state) again, and the current flows into the first power supply unit 14 via the current limiting resistor diode 152a and the first switch 153. When the input voltage of the second power supply unit 15 decreases below the terminal voltages of the capacitors 151a to 151c, charges stored in the capacitors 151a to 151c start to be discharged and flow into the first power supply unit 14 via the first switch 153. That is, power shortage attributable to decrease in the input voltage of the second power supply unit 15 is compensated by the discharging of the capacitors 151a to 151c, and the circuit configuration of the second power supply unit 15 shown in FIG. 1 forms a so-called valley fill circuit.

Further, since the peak voltage of the input voltage is divided by the series circuit of the plurality of capacitors 151a to 151c and a voltage above the predetermined voltage is not outputted by the first switch 153, the second power supply unit 15 functions as a step-down circuit. The diodes 152a to 152g connect the capacitors 151a to 151c in parallel and function as second diodes that cause a current to flow in an opposite direction to a direction in which the current flows during charging. Further, the diodes 152a to 152g and the first switch 153 function as a series/parallel switching circuit that switches between the series and parallel connections of the capacitors 151a to 151c. Furthermore, the control electrode of the first switch 153 (the gate electrode of the FET) and the input voltage of the second power supply unit 15 function as a first switch controller that controls the ON (closed state) and OFF (open state) of the first switch 153.

Further, the number of capacitors of the second power supply unit 15 is preferably two or more, but is not limited to a particular number. Furthermore, the first switch and the first switch controller preferably turns the first switch off (an open state) when the voltage inputted to the second power supply unit 15 is higher than a predetermined voltage, and turns the first switch on (a closed state) when the voltage inputted to the second power supply unit 15 is equal to or lower than the predetermined voltage. The first switch is not limited to the FET. For example, it may be a switch that is controlled by a microcomputer.

In accordance with the configuration of the first embodiment, energy loss due to thermal conversion is considerably small compared to that of the conventional example constructed with the constant voltage circuit using a Zener diode, thereby reducing the standby power of the load control device 1A. Therefore, in the state in which the load 3 is turned off, the current flowing into the load 3 via the second power supply unit 15 is further reduced, and the erroneous operation of the load (the erroneous light emission of an LED lamp) can be prevented even when a load, such as an LED lamp which has no countermeasure against noise, is connected.

(Second Embodiment)

Figure 3:
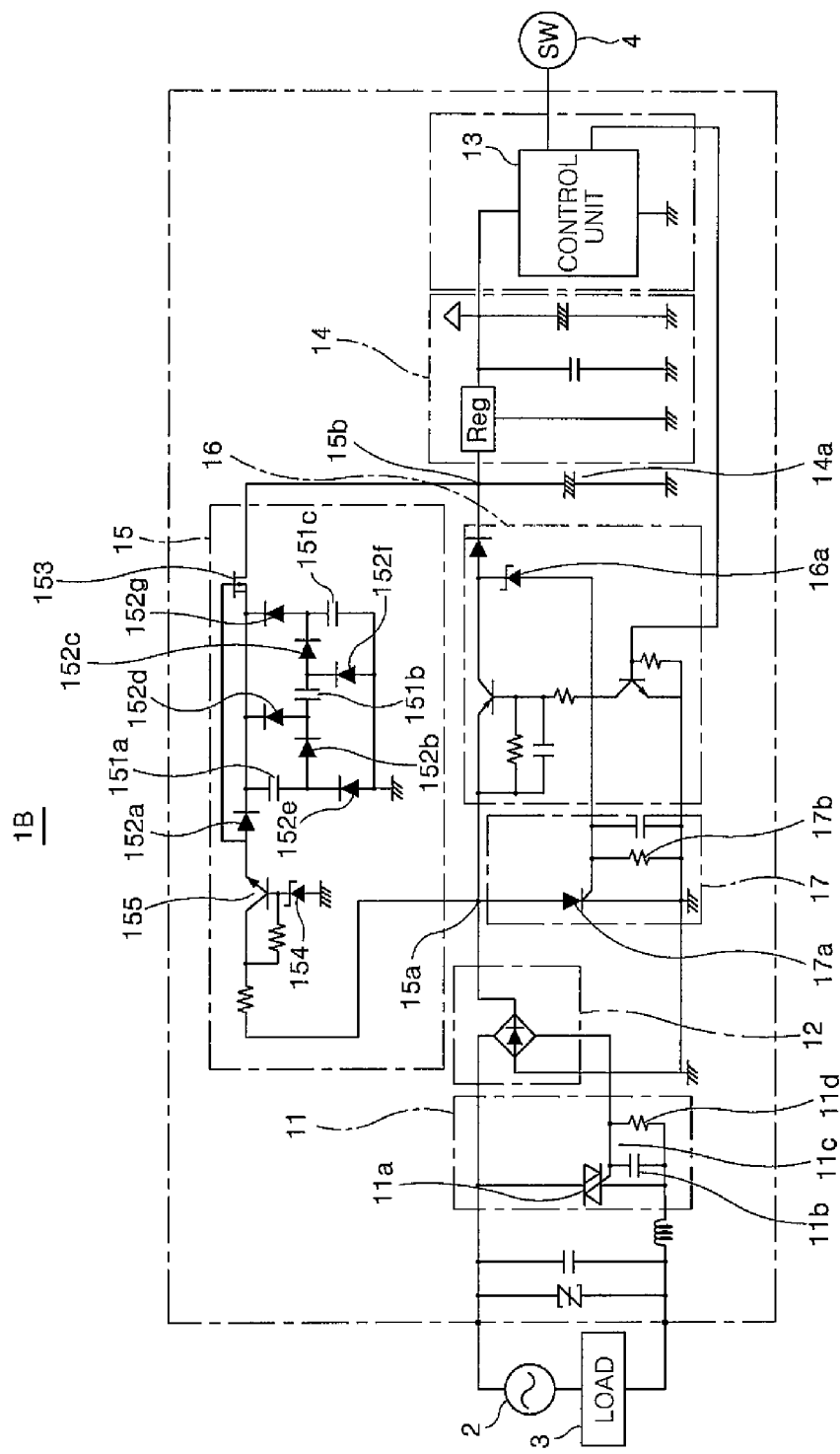
FIG. 3 is a circuit diagram showing a configuration of a two-wire load control device in accordance with a second embodiment of the present invention.
Figure 4:
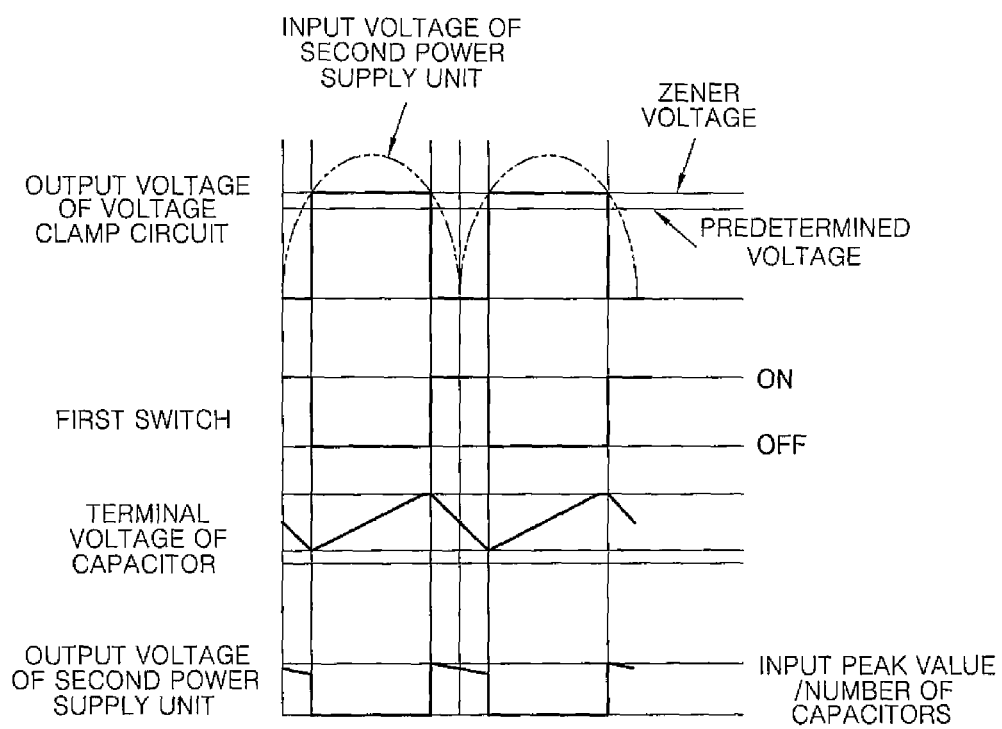
FIG. 4 is a timing chart illustrating the voltage and operation of each component of the two-wire load control device in accordance with the second embodiment of the present invention.

A two-wire load control device 1B in accordance with a second embodiment of the present invention will be described with reference to FIGS. 3 and 4. FIG. 3 is a circuit diagram showing the configuration of the two-wire load control device 1B, and FIG. 4 is a timing chart showing the voltage and operation of each component. The second power supply unit 15 of the load control device 1B is configured such that a voltage clamp circuit (a constant voltage circuit) including a Zener diode (a constant voltage diode) 154 and a semiconductor switch device 155 is connected with a front end of a plurality of diodes 151a to 151c that are connected in series to clamp an input voltage, in addition to the configuration of the first embodiment.

The square wave voltage based on the Zener voltage of the Zener diode 154 is outputted from the voltage clamp circuit, and the first switch 153 is turned on and off almost in synchronization with the square wave. When the first switch 153 becomes ON (a closed state), the voltage outputted from the voltage clamp circuit is almost 0V, and thus only charges discharged from the capacitors 151a to 151c are supplied to the first power supply unit 14. The voltage outputted from the second power supply unit 15 forms a substantial square wave that has the voltage obtained by dividing the peak voltage of input voltage by the number of capacitors, as its peak voltage.

The second power supply unit 15 in accordance with the second embodiment includes the voltage clamp circuit (constant voltage circuit) including the Zener diode 154 and the semiconductor switch device 155, as the conventional example. However, the current outputted from the voltage clamp circuit is used only to charge the capacitors 151a to 151c and does not flow directly into the first power supply unit 14, and thus the value of the current flowing through the clamp circuit is very small. Further, the output voltage of the voltage clamp circuit is divided and stepped down by the plurality of capacitors 151a to 151c. Accordingly, compared to the conventional example, the Zener voltage of the Zener diode 154 can be increased, and energy loss due to thermal conversion is further reduced. Furthermore, different from the configuration of the first embodiment, the voltage applied to parts, such as capacitors diodes or the like, is stepped down by the voltage clamp circuit, thereby ensuring the withstanding voltage of the parts.

(Third Embodiment)

Figure 5:
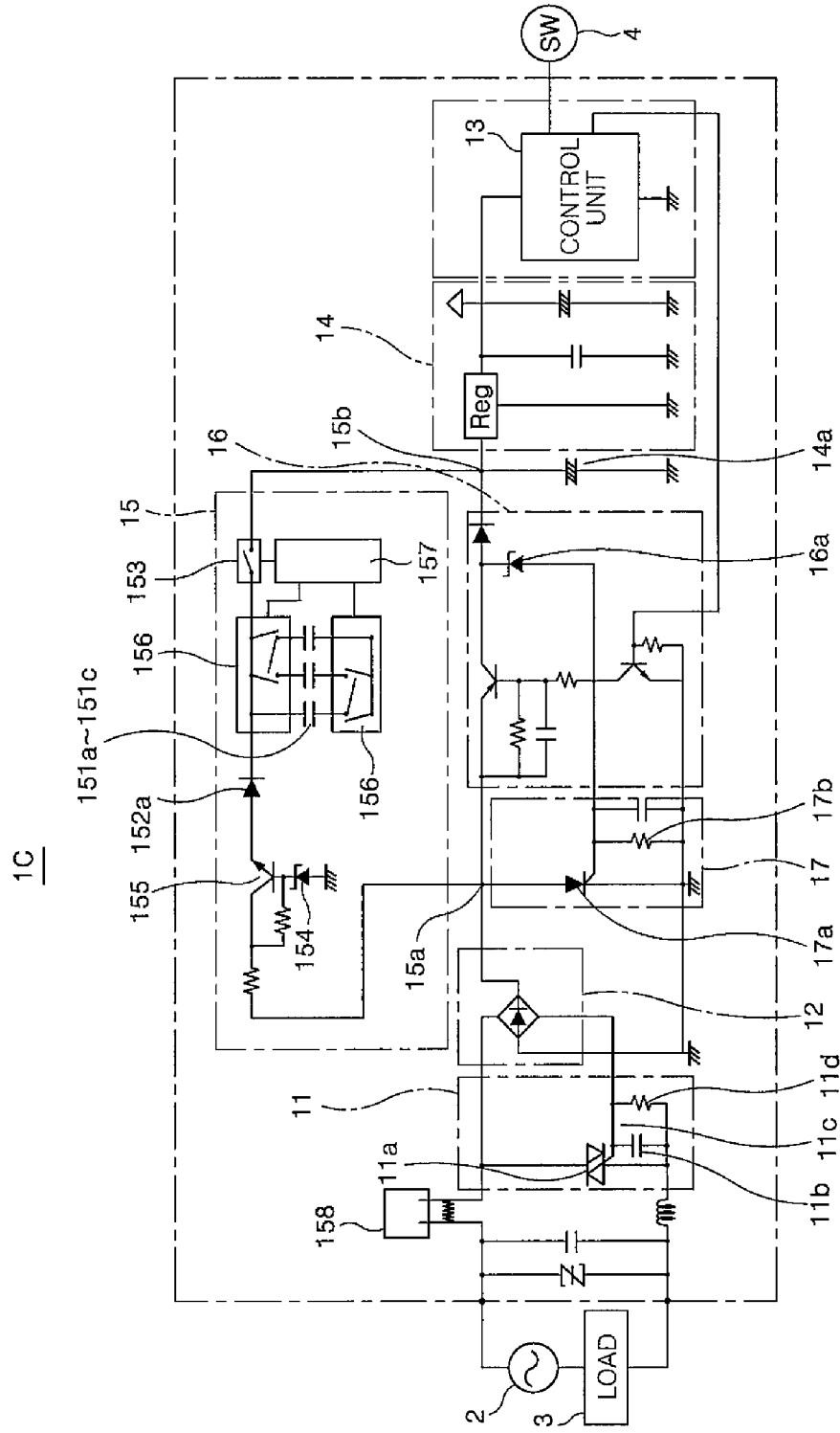
FIG. 5 is a circuit diagram showing a configuration of a two-wire load control device in accordance with a third embodiment of the present invention.

A two-wire load control device 1C in accordance with a third embodiment of the present invention will be described with reference to FIG. 5. FIG. 5 is a circuit diagram showing the configuration of the two-wire load control device 1C. In the third embodiment, a series/parallel switching circuit for switching between the series and parallel connections of a first switch 153 and a plurality of capacitors and a control unit thereof are implemented using ICs. The series/parallel switching circuit includes a second switch 156 connected to the terminals of the capacitors 151a to 151c and configured to switch between the series and parallel connections of the capacitors, and a second switch controller 157 configured to control the connection status of the second switch 156. The second switch controller 157 may also function as a first switch controller that controls the ON (closed state) and OFF (open state) of the first switch.

Further, when the number of capacitors is three or more, the second switch controller 157 may be configured to arbitrarily vary the number of capacitors that are connected in series. Alternatively, a peak voltage detection unit 158 may be provided to detect a peak voltage of the voltage inputted from the commercial power source 2 or the rectifying unit 12, thereby automatically varying the number of capacitors that are connected in series according to, e.g., the peak voltage of the input voltage. As is well known, the voltages of commercial power source 2 are classified into a 100 to 120V system and a 200 to 240V system. In accordance with this configuration, the same load control device 1C may be used in different voltage systems, such as a 100V system, a 200V system and the like, which are commercial powers.

Further, when the second switch controller 157 also functions as the first switch controller, the time for which the first switch 153 is opened may be controlled based on the peak voltage of the peak voltage detection unit 158. Alternatively, an output voltage detection unit 162 (see FIG. 7) may be provided to detect the voltage outputted from the second power supply unit 15 to the first power supply unit 14 and to control the time for which the first switch 153 is opened based on the output voltage of the second power supply unit 15.

For example, when the voltage inputted to the second power supply unit 15 or the voltage outputted from the second power supply unit 15 is higher than a predetermined threshold value, control is performed such that the time for which the first switch 153 is opened is reduced, thereby controlling the amount of current outputted from the second power supply unit 15 to be constant. Further, it may be configured to vary the threshold value depending on the peak voltage.

(Other Modifications)

Figure 6:
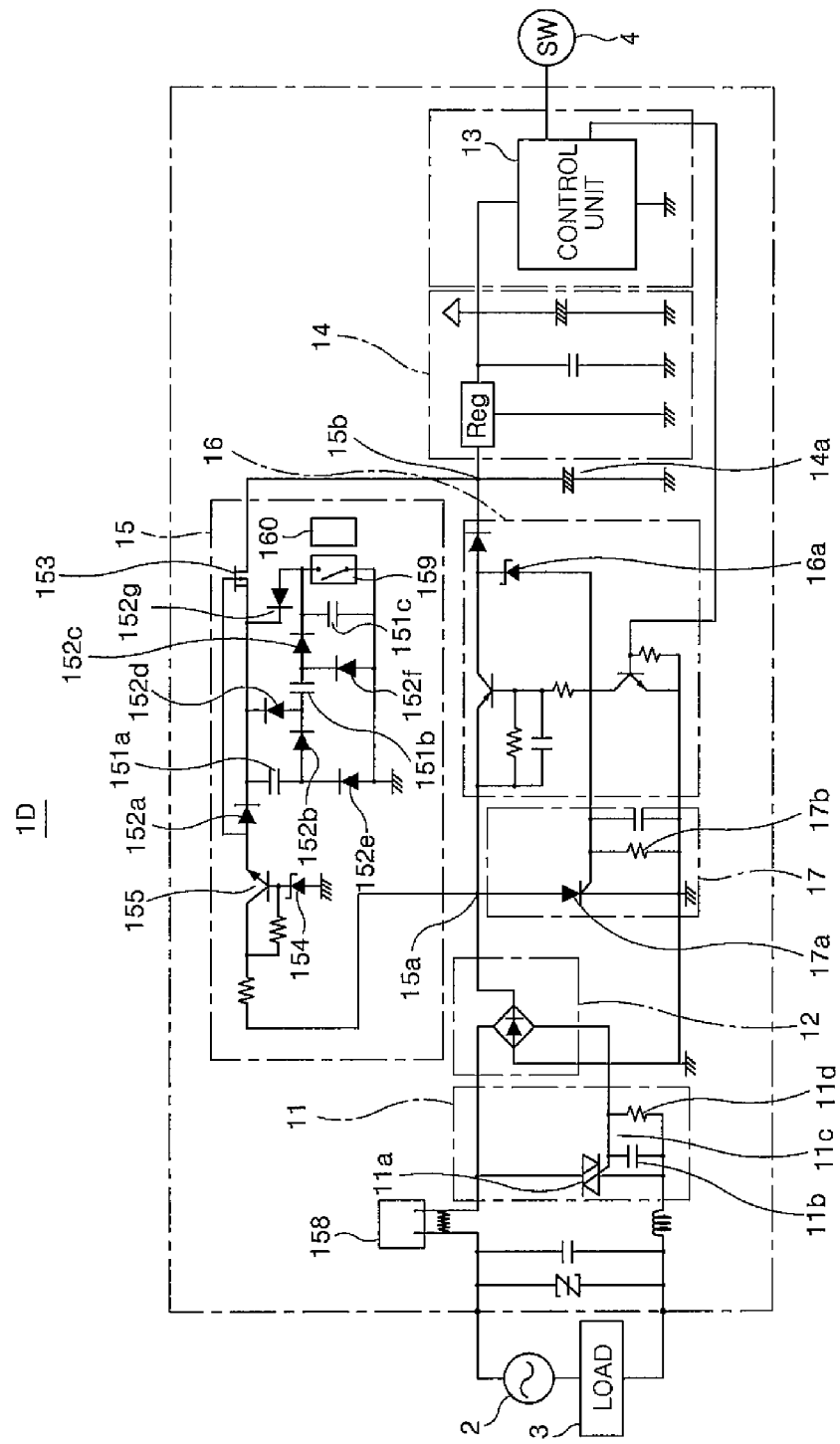
FIG. 6 is a circuit diagram showing a configuration of a two-wire load control device in accordance with a modification of the second embodiment.

FIG. 6 shows the configuration of a two-wire load control device 1D in accordance with a modification of the second embodiment shown in FIG. 3. In this modification, when the number of capacitors that are connected in series is three or more, a third switch 159 is connected in parallel to at least one of the plurality of capacitors 151a to 151c, and a third switch controller 160 configured to control the ON (closed state) and OFF (open state) of the third switch 159 is provided. With this, the number of capacitors connected in series can be varied. Further, the peak voltage detection unit 158 may be provided to detect the peak voltage of the voltage inputted from a commercial power source 2 or a rectifying unit 12 and to automatically vary the number of capacitors that are connected in series based on the peak voltage of the input voltage.

Figure 7:
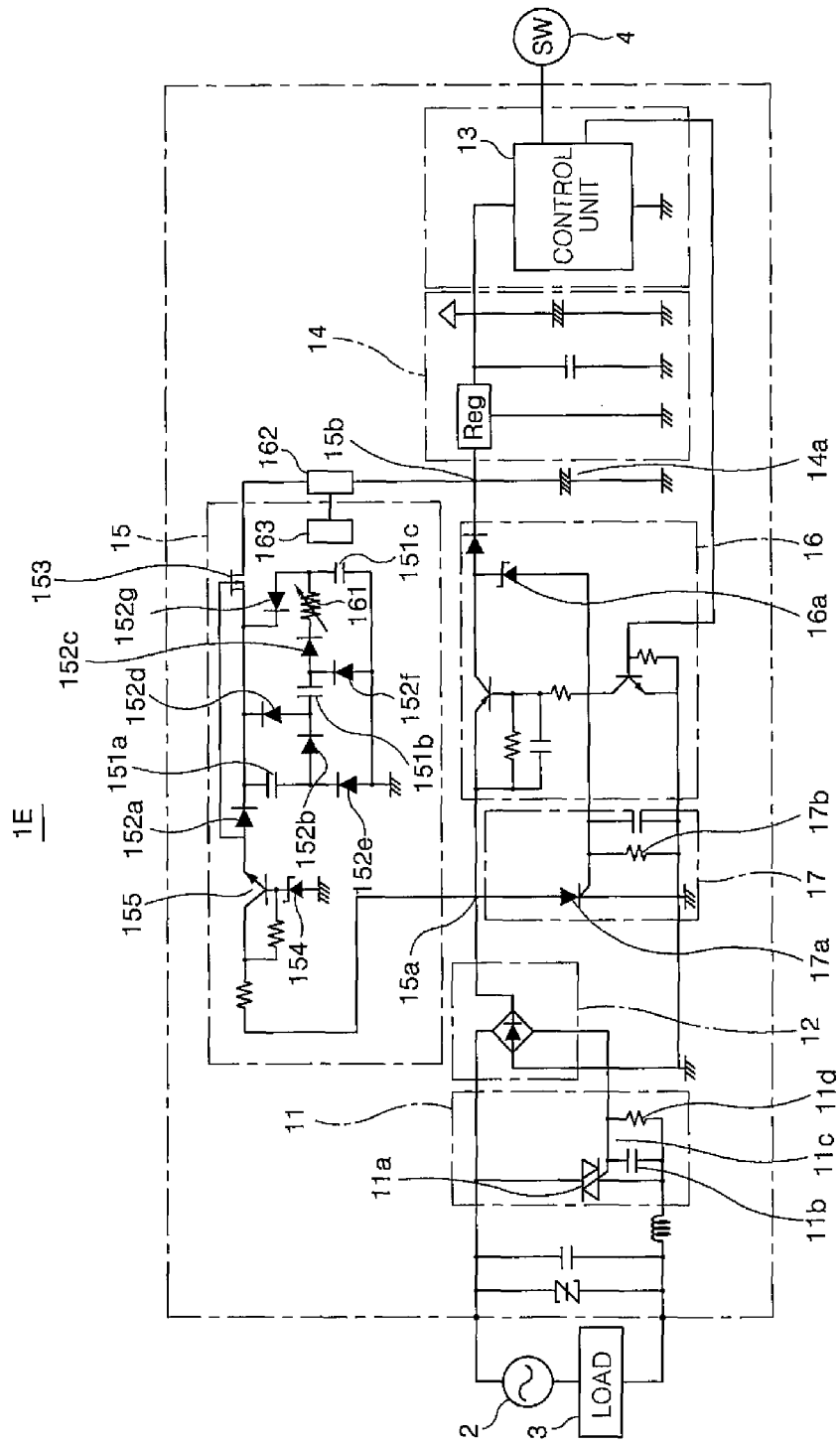
FIG. 7 is a circuit diagram showing a configuration of a two-wire load control device in accordance with another modification.

FIG. 7 is a circuit diagram showing the configuration of a two-wire load control device 1E in accordance with another modification. In the two-wire load control device 1E, a current limiting device 161, such as a resistor or the like, is connected in series to the series circuit of a plurality of capacitors 151a to 151c. The current with which the capacitors 151a to 151c are charged may be limited by the current limiting device 161. Further, the amount of current is varied by using a variable resistor as the current limiting device 161, and an output voltage detection unit 162 is provided to detect the voltage outputted from the second power supply unit 15 to the first power supply unit 14. Further, a current limiting device controller 163 is provided to control the amount of current varied by the current limiting device 161.

With this configuration, the amount of current is controlled by the current limiting device 161 based on the voltage outputted from the second power supply unit 15. Furthermore, although FIG. 7 is illustrated based on the configuration of the second embodiment shown in FIG. 3, it is not limited to the modification of the second embodiment, but the current limiting device may be added to the configuration of other embodiments (this is the same for the following modified embodiments, as long as there is no special incompatibility).

Figure 8:
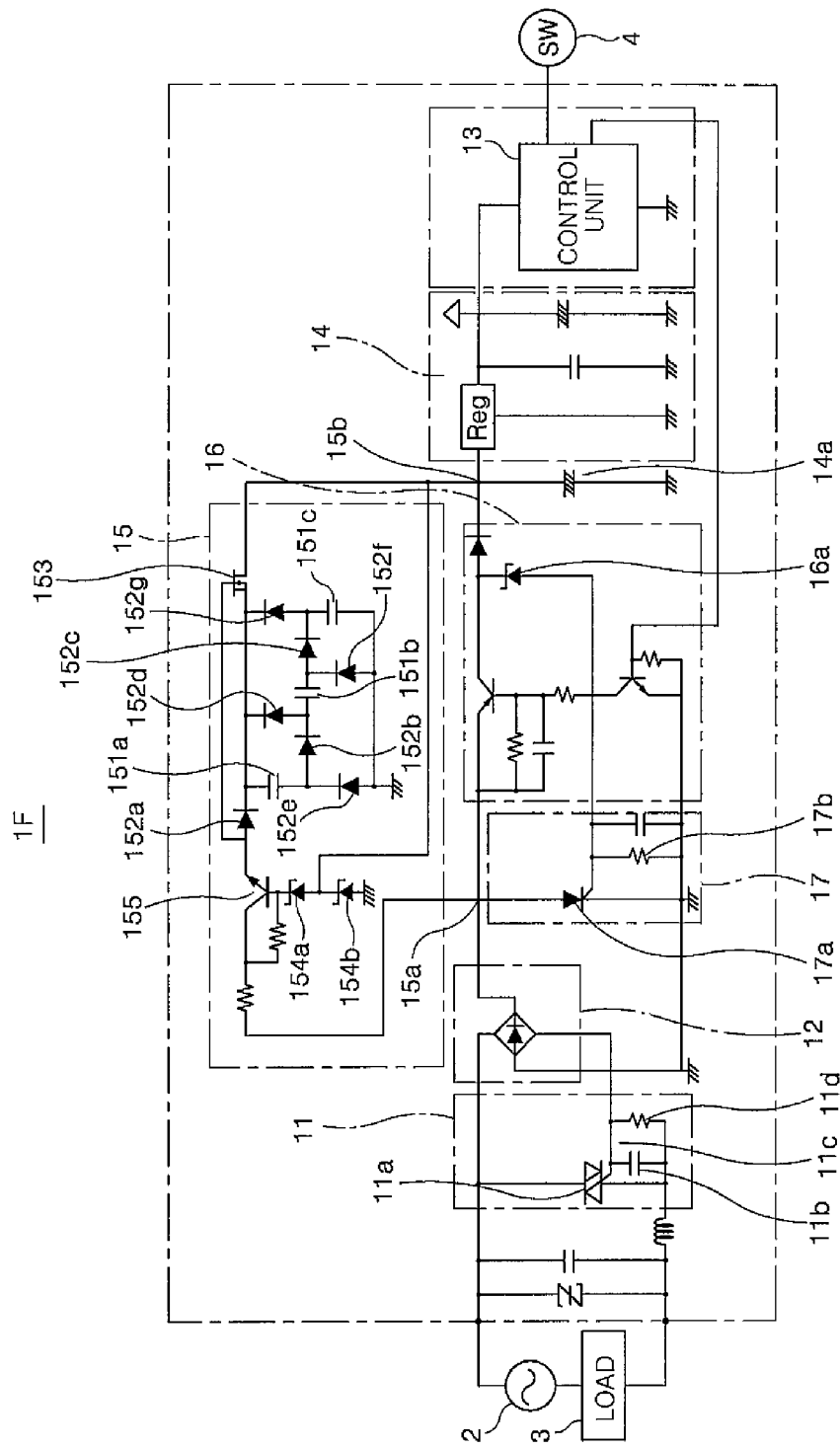
FIG. 8 is a circuit diagram showing a configuration of a two-wire load control device in accordance with still another modification.

FIG. 8 is a circuit diagram showing the configuration of a two-wire load control device 1F in accordance with still another modification.

In the two-wire load control device 1F, a plurality of Zener diodes 154a and 154b (whose number is not limited to two) that are connected in series is used as the Zener diodes of a voltage clamp circuit, and the intermediate voltage of Zener voltage is inputted to the output terminal 15b of a second power supply unit 15. While the current flowing through the Zener diodes of the voltage clamp circuit flows into the load 3 via the ground, the current flowing into the load 3 may be reduced by causing a part of the current to flow into a first power supply unit 14.

Figure 9:
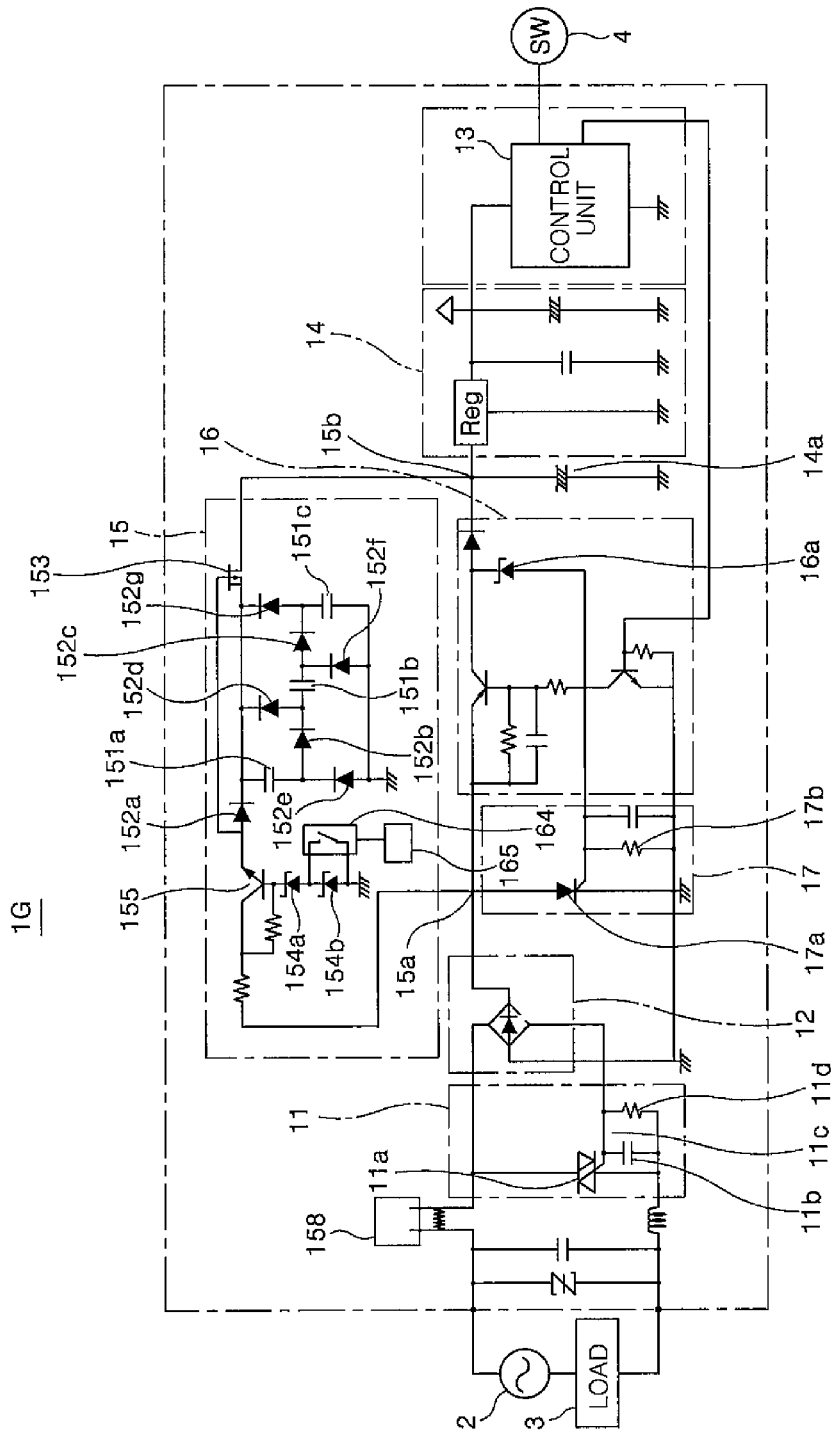
FIG. 9 is a circuit diagram showing a configuration of a two-wire load control device in accordance with still another modification.
Figure 10:
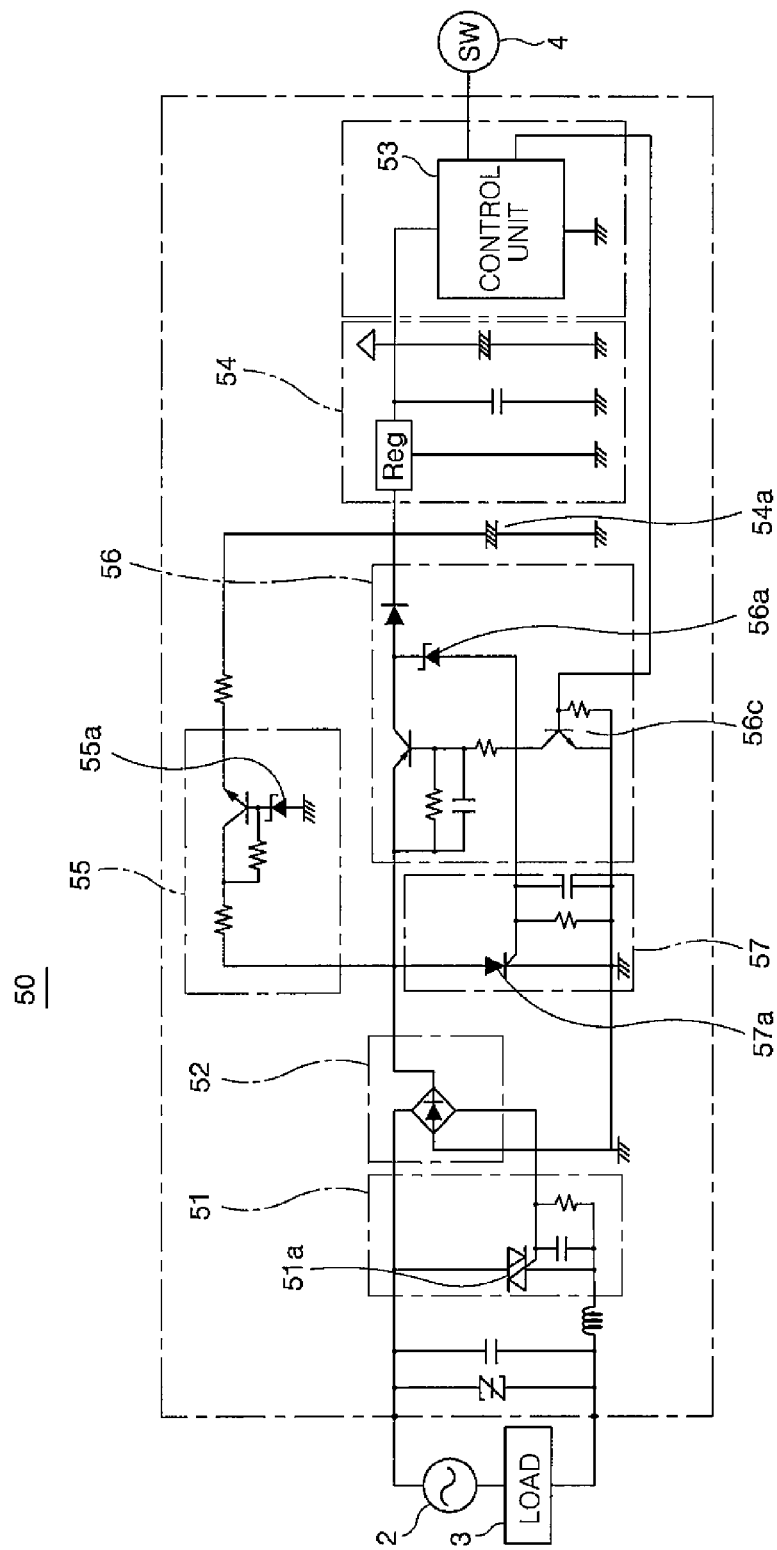
FIG. 10 is a circuit diagram showing a circuit configuration of a conventional two-wire load control device.

FIG. 9 is a circuit diagram showing the configuration of a two-wire load control device 1G in accordance with still another modification.

In the two-wire load control device 1F, a plurality of Zener diodes 154a and 154b (whose number is not limited to two) that are connected in series is used as the Zener diodes of a voltage clamp circuit, and a switch device 164 connected in parallel to at least one (e.g., the Zener diode 154b) of the Zener diodes and a fourth switch controller 165 configured to control the ON (closed state) and OFF (open state) of the switch device 164 are provided. In accordance with this configuration, Zener voltage may be converted based on the peak voltage of a commercial power source 2 to which the two-wire load control device 1G is connected, and thus the voltage output from the voltage clamp circuit may be converted to a constant value or an arbitrary value.

Further, although in each of the embodiments, the constant voltage circuit including the Zener diode and the semiconductor switch device has been illustrated as the voltage clamp circuit, the prevent invention is not limited thereto, but any one of other step-down circuits using a transformer or a capacitor may be used. Further, a plurality of sets of series circuits of a plurality of capacitors may be provided and the series and parallel connections of the plurality of sets of series circuits of the plurality of capacitors may be switched. Furthermore, the rectifying unit 12 is not necessarily a full-wave rectifier circuit, but may be a half-wave rectifier circuit. If the rectifying unit 12 is a half-wave rectifier circuit, the same effect can be achieved by providing two sets of half-wave rectifier circuits and second power supply units and connecting the two sets of half-wave rectifier circuits and second power supply units in parallel, thereby shifting the phase of current flowing through each of the circuits by a half period. Alternatively, it may be possible to be configured to connect a plurality of second power supply units in series.

While the invention has been shown and described with respect to the embodiments, the present invention is not limited to the above-described embodiments, and various changes and modification may be made without departing from the scope of the invention as defined in the following claims.

What is claimed is:

1. A two-wire load control device connected in series between a commercial power source and a load, comprising:
   a control unit configured to control ON and OFF of the load in response to a signal from an outside;
   a first power supply unit configured to reliably supply a power to the control unit;
   a second power supply unit configured to acquire an internal power when the load is turned off,
   wherein the second power supply unit includes a plurality of capacitors,
   a series/parallel switching circuit configured to switch between series and parallel connections of the plurality of capacitors,
   a switch connected to an output terminal for the first power supply unit and a switch controller configured to control ON (a closed state) and OFF (an open state) of the switch;

wherein when a voltage inputted to the second power supply unit is higher than a predetermined voltage, the series/parallel switching circuit allows the plurality of capacitors to be connected in series and charge the plurality of capacitors, and the switch controller turns the switch off (an open state); and wherein when the voltage inputted to the second power supply unit is equal to or lower than the predetermined voltage, the series/parallel switching circuit allows the plurality of capacitors to be connected in parallel and discharge the plurality of capacitors, and the switch controller turns the switch on (a closed state), so that charging and discharging of the plurality of capacitors are repeated and a power obtained by discharging of the plurality of capacitors is used as the internal power.

2. A two-wire load control device connected in series between a commercial power source and a load, comprising:

a primary switching unit configured such that main electrodes of a main switch device are connected in series to the commercial power source and the load, and configured to control power supply to load;

a rectifying unit connected between the main electrodes of the main switch device;

a control unit configured to control ON and OFF of the load in response to a signal from an outside;

a first power supply unit configured to reliably supply a power to the control unit;

a second power supply unit configured to supply a power to the first power supply unit when a power is supplied from both ends of the primary switching unit via the rectifying unit and the load is turned off; and a third power supply unit configured to supply power to the first power supply unit when a power is supplied from both ends of the primary switching unit via the rectifying unit and the load is turned on;

wherein the first power supply unit is a DC/DC converter configured to step down an input DC current so that an output voltage decreases below an input voltage;

wherein the second power supply unit includes a plurality of capacitors, a series/parallel switching circuit configured to switch between series and parallel connections of the plurality of capacitors, a first switch connected to an output terminal for the first power supply unit and a first switch controller configured to control ON (a closed state) and OFF (an open state) of the first switch;

wherein when a voltage inputted to the second power supply unit is higher than a predetermined voltage, the series/parallel switching circuit allows the plurality of capacitors to be connected in series and charge the plurality of capacitors, and the first switch controller turns the first switch off (an open state); and wherein when the voltage inputted to the second power supply unit is equal to or lower than the predetermined voltage, the series/parallel switching circuit allows the plurality of capacitors to be connected in parallel and discharge the plurality of capacitors, and the first switch controller turns the first switch on (a closed state), so that charging and discharging of the plurality of capacitors are repeated, thereby stepping down the voltage inputted from the rectifying unit to a predetermined level and then outputting resulting voltage.

3. The two-wire load control device of claim 2, wherein the second power supply unit further includes a voltage clamp circuit configured to clamp the voltage inputted from the rectifying unit to a predetermined value, thereby preventing a voltage above the predetermined voltage from being applied to the plurality of capacitors that are connected in series.

4. The two-wire load control device of claim 3, wherein the first switch and the first switch controller are formed of semiconductor devices configured to be conductive in response to input of a predetermined control signal, and a voltage outputted from the voltage clamp circuit is inputted to the semiconductor devices as the control signal.

5. The two-wire load control device of claim 3, wherein the voltage clamp circuit includes a plurality of constant voltage diodes that are connected in series, and an intermediate conjunction of the plurality of constant voltage diodes connected in series is connected to an input unit of the first power supply unit, so that a part of current to flow the plurality of constant voltage diodes connected in series is caused to flow into the first power supply unit.

6. The two-wire load control device of claim 3, wherein the voltage clamp circuit includes a plurality of constant voltage diodes connected in series and a switch device connected in parallel to at least one of the constant voltage diodes, the load control device further comprises a peak voltage detection unit configured to detect a peak voltage of voltage inputted from the commercial power source or the rectifying unit and a fourth switch controller configured to control ON (a closed state) and OFF (an open state) of the switch device, and the fourth switch controller varies a voltage of the constant voltage diode based on the peak voltage.

7. The two-wire load control device of claim 2, wherein the series/parallel switching circuit includes a second switch connected to terminals of the plurality of capacitors and configured to switch between series and parallel connections of the plurality of capacitors and a second switch controller configured to control a connection state of the second switch.

8. The two-wire load control device of claim 7, wherein the plurality of capacitors is three or more in number, and the second switch controller varies the number of the plurality of capacitors that are connected in series.

9. The two-wire load control device of claim 8, wherein the second power supply unit further includes a peak voltage detection unit configured to detect a peak voltage of voltage from the commercial power source or the rectifying unit, and the second switch controller varies the number of the plurality of capacitors that are connected in series by the second switch based on a peak voltage of the commercial power source.

10. The two-wire load control device of claim 2, wherein the series/parallel switching circuit includes first diodes connected in series between the plurality of capacitors and second diodes connected such that a current flows in an opposite direction to a direction in which the current flows during the charging.

11. The two-wire load control device of claim 10, wherein the plurality of capacitors is three or more in number, the second power supply unit further includes a third switch connected in parallel to at least one of the plurality of capacitors and a third switch controller configured to control ON (a closed state) and OFF (an open state) of the third switch, and the number of the plurality of capacitors connected in series is varied by controlling the ON (closed state) and OFF (open state) of the third switch.

12. The two-wire load control device of claim 11, wherein the second power supply unit further includes a peak voltage detection unit configured to detect a peak voltage of voltage inputted from the commercial power source or the rectifying unit, and the third switch controller varies the number of the plurality of capacitors connected in series by the third switch based on the peak voltage of the commercial power source.

13. The two-wire load control device of claim 2, wherein the second power supply unit further includes a current limiting device configured to limit an amount of current with which the plurality of capacitors is charged when the plurality of capacitors are connected in series.

14. The two-wire load control device of claim 13, wherein the current limiting device varies the amount of current,
   the second power supply unit further includes an output voltage detection unit configured to detect a voltage outputted from the second power supply unit to the first power supply unit and a current limiting device controller configured to control the amount of current by the current limiting device, and
   the current limiting device controller controls the amount of current by the current limiting device based on the voltage outputted from the second power supply unit which is detected by the output voltage detection unit.

15. The two-wire load control device of claim 2, wherein the second power supply unit further includes a peak voltage detection unit configured to detect a peak voltage of voltage inputted from the commercial power source or the rectifying unit, and the first switch controller controls a time for which the first switch is opened based on the peak voltage.

16. The two-wire load control device of claim 15, wherein the second power supply unit further includes an output voltage detection unit configured to detect a voltage outputted from the second power supply unit to the first power supply unit, and
   the first switch controller controls a time for which the first switch is opened based on the voltage outputted from the second power supply unit.

17. The two-wire load control device of claim 2, wherein the first switch and the first switch controller are formed of semiconductor devices configured to be conductive in response to an input of a predetermined control signal, and a voltage outputted from the rectifying unit is inputted to the semiconductor devices as the control signal.

* * * * *